(12) United States Patent
Chandnani et al.

(10) Patent No.: US 7,103,355 B2
(45) Date of Patent: Sep. 5, 2006

(54) METHOD AND APPARATUS FOR SUPPORTING MULTIPLE MOBILE ADDRESS SCHEMES USING OBJECT-ORIENTED PROGRAMMING TECHNIQUES

(75) Inventors: Vishal Sham Chandnani, Randolph, NJ (US); David Chu Hom, Whitestone, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 443 days.

(21) Appl. No.: 10/460,534

(22) Filed: Jun. 12, 2003

(65) Prior Publication Data

US 2003/0210675 A1 Nov. 13, 2003

Related U.S. Application Data (63) Continuation of application No. 09/410,012, filed on Sep. 30, 1999, now abandoned.

(51) Int. Cl.
*H04M 3/00* (2006.01)

(52) U.S. Cl. .................. 455/418; 455/557; 455/186.1; 455/412.1; 717/100; 717/165; 717/116; 717/168

(58) Field of Classification Search ................ 455/345, 455/557, 418, 419, 186.1, 550.1, 575.1, 424, 455/425, 456.5, 456.6, 561, 432.2, 433, 422.1, 455/552.1, 434, 413, 556.1, 161.2, 183.2, 455/553.1, 412.1, 412.2, 435.1, 435.2, 556.2; 370/316, 328, 339, 349, 327, 329, 340; 379/201.03, 379/93.04, 93.05, 93.06, 93.24; 700/18, 700/24, 23.7; 712/17.245; 713/190; 717/100, 717/106, 122, 176, 165, 164, 114, 116, 168, 717/136.108

See application file for complete search history.

(56) References Cited

U.S. PATENT DOCUMENTS

| | | | | |
|---|---|---|---|---|
| 5,499,266 A | * | 3/1996 | Yokev et al. | 375/136 |
| 5,930,479 A | * | 7/1999 | Hall | 709/238 |
| 6,104,929 A | * | 8/2000 | Josse et al. | 455/445 |
| 6,188,899 B1 | * | 2/2001 | Chatterjee et al. | 455/435.1 |
| 6,269,254 B1 | * | 7/2001 | Mathis | 455/557 |
| 6,282,294 B1 | * | 8/2001 | Deo et al. | 380/270 |
| 6,292,473 B1 | * | 9/2001 | Duske et al. | 370/316 |

OTHER PUBLICATIONS

James O. Coplien, "Advanced C++ programming styles and idioms," ISBN 0-201-54855-0, pp. 43, 92-93, 108-111 and 133-140 (1992).

* cited by examiner

*Primary Examiner*—Edward F. Urban
*Assistant Examiner*—Charles Chow (57) ABSTRACT

A method and apparatus are disclosed that support multiple mobile address types using object-oriented programming techniques. A mobile address object class supports the creation of mobile address objects. The mobile address object class includes the test-and-branch code that supports each mobile address type. A CPA Mobile Address class allows mobile address information to be stored in CPAMA objects in a uniform manner. The CPA Mobile Address class provides the address retrieval functionality to map the stored mobile address information to a suitable format. The CPAMA class provides a set of constructors to create and initialize its data members using an appropriate format, such as an access channel format or an ANSI International Mobile Station Identifier format, and a set of destructors to de-initialize objects before they are destroyed. The address information can be extracted from a CPAMA object using a set of member functions. Member functions to test equality and to assign one mobile address object to another are also provided.

22 Claims, 5 Drawing Sheets

```
       ┌ CPAMobileAddress(
       │ const ACCESS_ADDR_TYPE& access_addr,    // in: access mobile address
610 ─┤  UCHAR a_type,                            // in: mobile address type
       │ UCHAR imsi_act                          // in: IMSI active flag
       │ );
       └

┌ CPAMobileAddress(
650 ─┤  IFIMSIDATA& imsi_addr,                   // in: ANS1-41 imsi mobile address
       │ UCHAR imsi_len                          // in: IMS1 length
       │ );
       └
```

FIG. 7A

```
      ⎧ BOOLEAN
      ⎪ getAddress(                        // retrieves access channel address
710 ⎨ ACCESS_ADDR_TYPE& access_addr,       // in/out: access mobile address
      ⎪ UCHAR& a_type                      // out: access address type
      ⎩ ) const;

⎧ BOOLEAN
      ⎪ getAddress(                        // retrieves mobile address to be used
      ⎪                                    // to communicate with the mobile over
715 ⎨                                      // the paging channel
      ⎪ PAGE_ADDR_TYPE& page_addr,         // in/out: page mobile address
      ⎪ UCHAR& p_type                      // out: paging address type
      ⎩ ) const;

⎧ BOOLEAN
      ⎪ getAddress(                        // retrieves mobile address to be used
720 ⎨                                      // to send up to the RCC (min1/min2/esn)
      ⎪ cp_min_esn_addr_type&   min_esn
      ⎩ ) const;

⎧ BOOLEAN
      ⎪ getAddress(                        // retrieves an IMSI mobile address in
      ⎪                                    // ANSI-41 format, to send to the RCC
725 ⎨ IFIMSIDATA& imsi_addr,               // in/out: ANSI-41 imsi mobile address
      ⎪ UCHAR& imsi_len                    // in/out: IMSI legnth
      ⎩ ) const;

⎧ inline
      ⎪ UCHAR
      ⎪ getAccessAddressType(              // returns access channel address type
730 ⎨ ) const
      ⎪ [
      ⎪     return d_access_addr_type;
      ⎩ )

⎧ inline
      ⎪ UCHAR
      ⎪ getPagingAddressType(              // returns paging channel address type
735 ⎨ ) const
      ⎪ [
      ⎪     return d_paging_addr_type;
      ⎩ )
```

FIG. 7B

```
       ⎧ inline
       ⎪ UCHAR
       ⎪ isValidAddress(                    // returns d_valid_entry flag, which is used
       ⎪                                    // to indicate if d_mobile_address contains
  740 ⎨                                     // valid address information
       ⎪ ) const
       ⎪ {
       ⎪      return d_valid_entry;
       ⎩ }

⎧ inline
       ⎪ void
       ⎪ invalidateAddress(                 // sets d_valid_entry flag to FALSE
  745 ⎨ )
       ⎪ {
       ⎪      d_valid_entry = FALSE;
       ⎩ }

⎧ BOOLEAN
       ⎪ setPagingAddressType(              // sets paging address type
       ⎪
  750 ⎨
       ⎪
       ⎪ UCHAR p_type
       ⎩ ) ;

⎧ BOOLEAN
       ⎪ operator == (                      // compares the CPAMobileAddress object passed to
  760 ⎨                                     // it, with 'this' CPAMobileAddress object
       ⎪ const CPAMobileAddress& other_addr // in: other CPAMobileAddress object
       ⎩ ) ;

⎧ CPAMobileAddress&
       ⎪ operator = (                       // assigns class data members to data members of the
       ⎪                                    // object passed to it as parameter
       ⎪ const CPAMobileAddress& addr
  770 ⎨ ) ;
       ⎪
       ⎪ //    ------ FRIENDS:
       ⎩ //    none
```

METHOD AND APPARATUS FOR SUPPORTING MULTIPLE MOBILE ADDRESS SCHEMES USING OBJECT-ORIENTED PROGRAMMING TECHNIQUES

CROSS REFERENCE TO RELATED APPLICATIONS

This application is a continuation application of U.S. patent application Ser. No. 09/410,012 filed Sep. 30, 1999 now abandoned.

FIELD OF THE INVENTION

The present invention relates generally to wireless communication systems, and more particularly, to methods and apparatus for translating mobile addresses in such wireless communication systems.

BACKGROUND OF THE INVENTION

Wireless communication networks are increasingly being utilized to transfer information, such as data, voice, text or video information, among communication devices. A number of technologies and protocols have been proposed or suggested to maximize the utilization of the available bandwidth in a wireless communication network. Code division multiple access (CDMA) techniques, for example, have been employed in many digital wireless communication systems to permit a large number of system users to communicate with one another. CDMA networks were initially designed to carry voice traffic between a mobile receiver unit and a base station.

Many communication systems utilizing code division multiple access comply with the IS-95 standard, adopted by the Telecommunication Industry Association (TIA). Under the IS-95 standard, a communication system substantially eliminates co-channel interference on the forward link from a base station or cell site to a mobile receiver unit by modulating the information signals with Walsh orthogonal function sequences. A more detailed discussion of the IS-95 standard is provided in "Mobile Station-Base Station Compatibility Standard for Dual-Mode Wideband Spread Spectrum Cellular System," Telecommunication Industry Association Doc. No. TIA/EIA/IS-95 (1993), incorporated by reference herein.

The mobile receiver unit is typically identified on the wireless communication network using a mobile address. In a given wireless communication network, however, a number of heterogeneous network technologies may be involved, each with potentially different mobile address types. Thus, a number of different mobile address types may need to be supported. The increasing diversity of network elements in such wireless communication network provides additional challenges for network managers that attempt to manage network resources in a uniform manner. Currently, the call processing software that utilizes mobile addresses must explicitly determine the mobile address type by performing a series of hard-coded "test-and-branch" statements. Once the appropriate mobile address type is identified, by satisfying a corresponding test, a series of type-specific processing steps are then performed. Thus, each time a new mobile address type is added to a given wireless communication network, the software must be updated in various places.

A need exists for a cross-platform mobile address plan. A further need exists for a method and apparatus that support multiple mobile address types using object-oriented programming techniques. Yet another need exists for a method and apparatus that can record and deliver multiple mobile addresses in a desired format. Finally, a need exists for an object-oriented approach that allows the diverse mobile address types of different manufacturers to be maintained using a uniform set of commands and functions.

SUMMARY OF THE INVENTION

Generally, a method and apparatus are provided that support multiple mobile address types using object-oriented programming techniques. A mobile address object class supports the creation of mobile address objects. The test-and-branch code that supports each of the specific mobile address types is now provided as part of the functions provided by the mobile address object class.

According to one aspect of the invention, a CPA Mobile Address (CPAMA) class allows mobile address information received from a mobile unit on an access channel to be stored in CPAMA objects in a uniform manner. The CPA Mobile Address class provides the address retrieval functionality to map the stored mobile address information to a suitable format to be sent to a mobile switching center (MSC), or to address a mobile unit over the paging channel.

The CPAMA class provides a set of constructors to create and initialize its data members using an appropriate format, such as an access channel format or an ANSI International Mobile Station Identifier (IMSI) format. In addition, the CPAMA class provides a set of destructors to de-initialize objects before they are destroyed. The address information can be extracted from a CPAMA object using a set of member functions. In order to retrieve information pertaining to an address object, the user of the class can request the information from the CPAMA object using the class member functions. The CPAMA class also provides a member function ("==") to test equality of two CPAMA objects and a member function ("=") to assign one mobile address object to another.

A more complete understanding of the present invention, as well as further features and advantages of the present invention, will be obtained by reference to the following detailed description and drawings.

DETAILED DESCRIPTION

Figure 1:
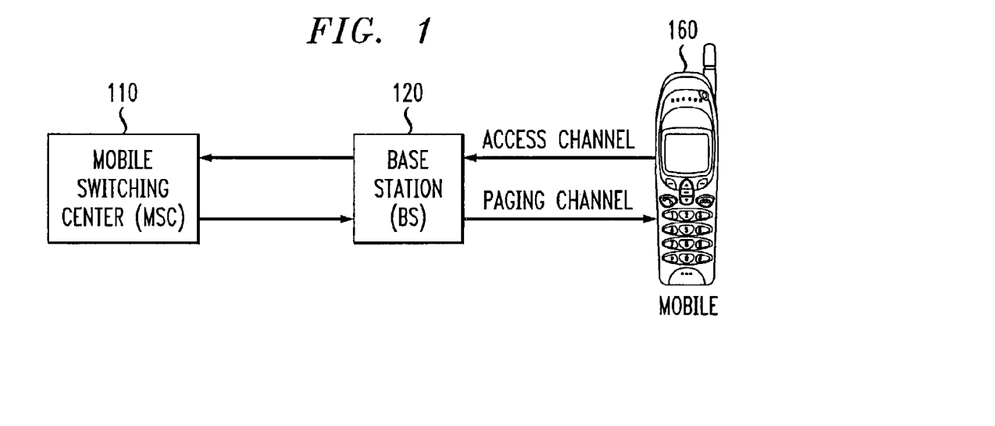
FIG. 1 illustrates a wireless network environment in which the present invention may operate.

FIG. 1 illustrates the wireless network environment in which the present invention may operate. While the present invention is illustrated in the context of a CDMA wireless network, the present invention may be implemented in other wireless networks as well, including TDMA networks, as would be apparent to a person of ordinary skill in the art. Generally, the present invention provides a method and apparatus that support multiple mobile address types using object-oriented programming techniques. According to one feature of the present invention, an object class is provided to support the creation of mobile address objects. Thus, the present invention relieves an application of the responsibility of maintaining mobile addresses. According to another feature of the present invention, the test-and-branch code that supports each of the specific mobile address types is provided as part of the functions provided by the mobile address object class. In this manner, from the perspective of the application software, the test-and-branch code is replaced by a function call to the mobile address object. Thus, modifications to an existing mobile address type or the addition of a new mobile address type can be implemented by changing only the functions provided by the mobile address object class.

As shown in FIG. 1, and discussed further below, call processing software on the base station 120, provides a CPA Mobile Address class that allows mobile address information that is received from the mobile unit 160 on the access channel to be stored in CPAMA objects in a uniform manner. In addition, the CPA Mobile Address class provides the address retrieval functionality to map the stored mobile address information to a suitable format to be sent to the mobile switching center 110, or to address a mobile unit 160 over the paging channel. The base station call processing software that provides the CPA Mobile Address class may be embodied, for example, as the AutoPlex™ software, commercially available from Lucent Technologies Inc. of Murray Hill, N.J., as modified herein to provide the features and functions of the present invention.

The CPAMA class provides a set of constructors, discussed below in a section entitled "Class Constructors," to create and initialize its data members using an appropriate format, such as access channel or ANSI International Mobile Station Identifier. The CPAMA class stores both an access channel address type (for the access channel) and paging channel address type (for the paging channel). In addition, the CPAMA class provides a set of destructors to de-initialize objects before they are destroyed. As discussed below in a section entitled "Member Functions," a CPAMA object is created and passed around within the software and the address information is extracted from the CPAMA object using the member functions of the class. Thus, the user of the class does not need to know a particular mobile address value, or how the mobile address is stored. In order to retrieve information pertaining to an address object, the user of the class can request the information from the CPAMA object using the class member functions. In the illustrative embodiment, the class has the functionality to retrieve mobile address information in the following formats: access channel mobile address, paging channel mobile address, min1/min2/esn mobile address or an ANSI-formatted IMSI address.

Since it is often desired to know if one mobile address if the same address as another mobile address, without having to know what the address types are, the present invention provides a member function ("==") in the mobile address object class to test equality of two CPAMA objects. In addition, the present invention provides a member function ("=") in the mobile address object class to assign one mobile address object to another.

Figure 2:
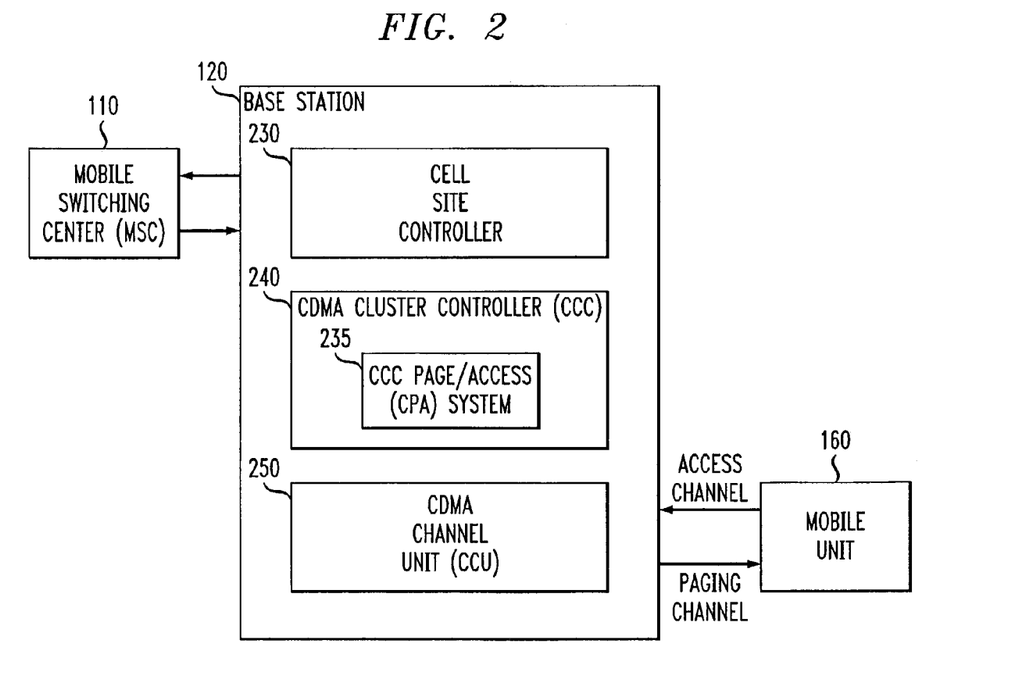
FIG. 2 is a schematic block diagram of the base station of FIG. 1.

FIG. 2 illustrates the wireless network environment of FIG. 1 in further detail. Specifically, FIG. 2 illustrates the various sub-systems that comprise the base station 120, including a cell site controller 230, a CDMA cluster controller (CCC) 240 and a CDMA channel unit (CCU) 250. For a detailed discussion of these sub-systems, see, for example, "AUTOPLEX System 1000 CDMA Product Overview," AT&T Document No. 401-614-010 (December 1994), commercially available from AT&T Customer Information Center, Indianapolis, Ind. According to a feature of the present invention, the CCC page/access sub-system 235 of the CDMA cluster controller 240 provides the CPAMA class functionality. As discussed further below in conjunction with FIGS. 3 and 4, the CCC page/access system 235 processes call-processing messages (i) received on the access channel from the mobile unit 160 for the mobile switching center 110, and (ii) received from the mobile switching center 110 destined for the mobile unit 160 on the paging channel.

Message Processing

Figure 3:
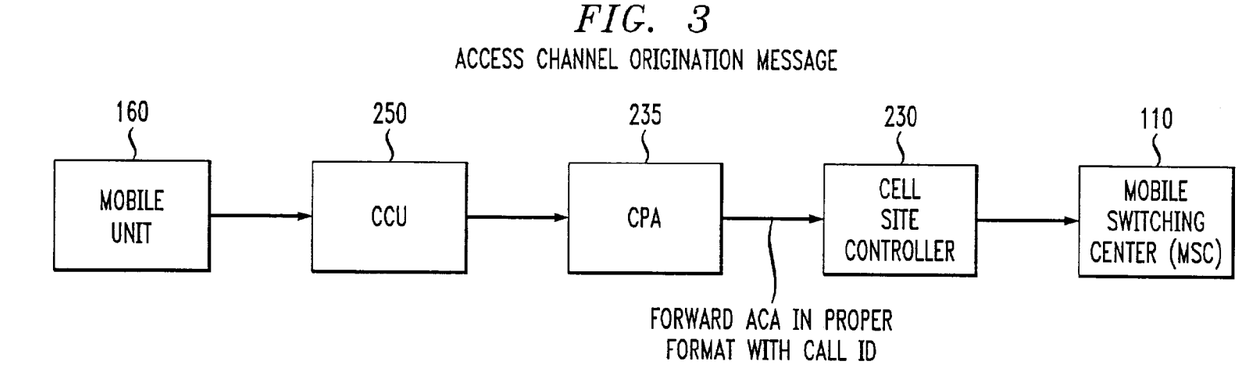
FIG. 3 illustrates the processing of an origination message (request for a channel) from a mobile unit on an access channel in the wireless network environment of FIG. 1, in accordance with the present invention.

FIG. 3 illustrates the processing of an origination message (request for a channel) from the mobile unit 160 on the access channel. As shown in FIG. 3, the origination message is initially received from the mobile unit 160 at the base station 120 by the CDMA channel unit 250. The CCC page/access system 235 then receives the origination message and extracts the access channel address. The CCC page/access system 235 then stores the ACA in a CPAMA object, in accordance with the present invention. Thereafter, the CCC page/access system 235 can forward the origination message, together with a call identifier, with the ACA in the proper format using the member functions of the CPAMA class. The illustrative implementation supports two ACA types that can be provided to the cell site controller 230 on the access channel, namely, a min1/min2/esn mobile address type or an ANSI-formatted IMSI address type. The call identifier allows the channel assignment that is subsequently received in a channel assignment message, discussed below in conjunction with FIG. 4, to be associated with the proper mobile unit 160.

Figure 4:
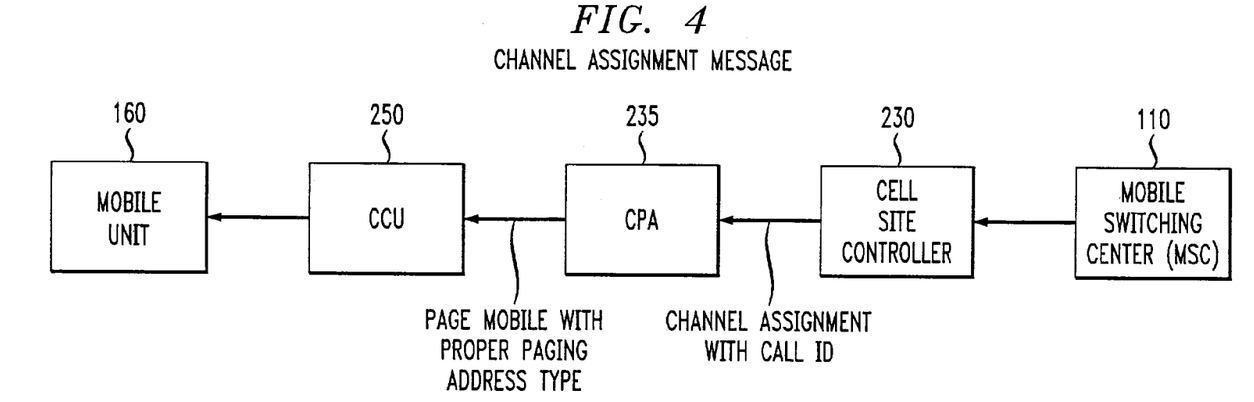
FIG. 4 illustrates the processing of a channel assignment message from a mobile switching center to a mobile unit on a paging channel in the wireless network environment of FIG. 1, in accordance with the present invention.

FIG. 4 illustrates the processing of a channel assignment message from the mobile switching center 110 to the mobile unit 160 on the paging channel. As previously indicated, the channel assignment message has an associated call identifier that is used by the CCC page/access system 235 to associate the received channel assignment with the proper mobile unit 160. Thus, the CCC page/access system 235 will receive the channel assignment message and perform a database lookup and identify the CPAMA object that was previously established for the mobile unit 160 (and that can be identified using the call identifier). Once identified, the appropriate CPAMA object identifies the proper paging address type to utilize for the mobile unit 160. For example, the CPMA object may indicate that channel assignment message should be sent via the CDMA channel unit 250 to the mobile unit 160 on the paging channel with the electronic serial number as the paging address type.

Similarly, for an inbound call to a mobile unit 160, the cell site controller 230 will generate a page message with the appropriate min1/min2/esn mobile address type or an ANSI-formatted IMSI address type. The CPA 235 will extract the mobile address and create a CPAMA object for the call. In addition, the CPA 235 will forward a page message to the mobile unit 160 with the appropriate paging address type.

Figure 5:
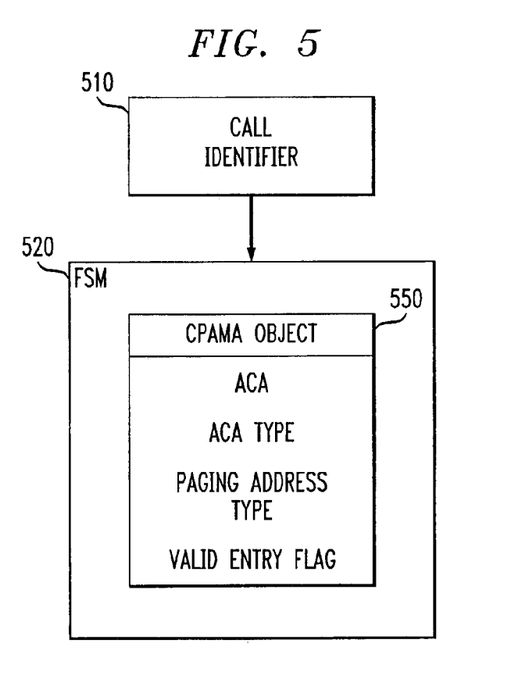
FIG. 5 illustrates the representation of each call as a finite state machine that includes, among other things, a CPAMA object in accordance with the present invention.

As shown in FIG. 5, the CCC page/access system 235 represents each call as a finite state machine 520 identified by a call identifier field 510 that points to the FSM 520. The FSM 520 contains a CPAMA object 550 associated with the call. The CPAMA object 550, like all members of the CPAMA class, has four data members, namely, the ACA, ACA type, paging address type and valid entry flag associated with each call. As previously indicated, the ACA value identifies the access channel address that was assigned to the call and received from the mobile unit 160. The ACA type identifies the format of the ACA value. The paging address type identifies the address format that must be utilized to page the mobile unit 160 associated with the call on the paging channel. For example, under the IS-95 standard, the ACA type consists of an IMSI and an ESN value, while the paging address type is an ESN value. Finally, the valid entry flag indicates if the CPAMA object contains valid address information.

Class Constructors

As previously indicated, the CPAMA class provides a set of constructors to create and initialize its data members using an appropriate format, such as access channel or ANSI International Mobile Station Identifier. The format of the mobile address that is received from the mobile unit 160 or in a message from the cell site controller 230 will determine the particular constructor that is utilized to create and initialize the CPAMA object for the call.

Figure 6:
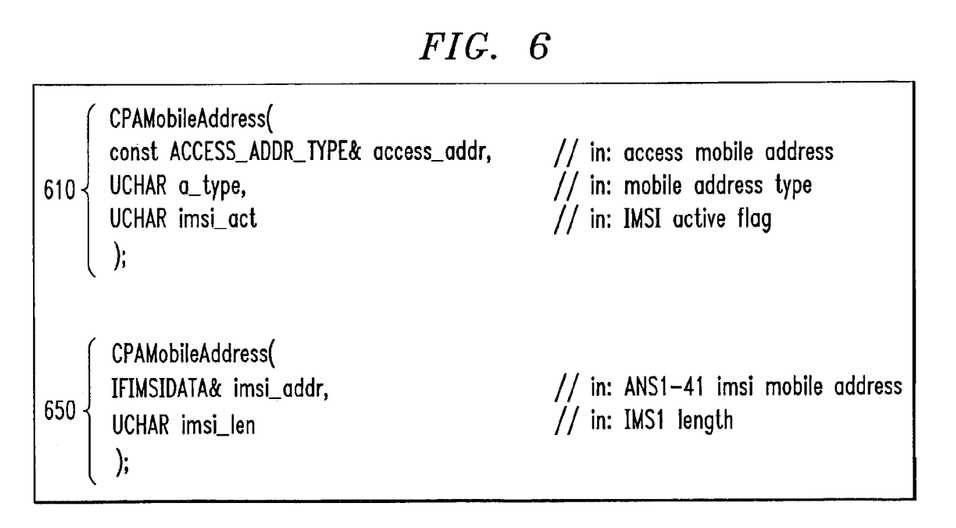
FIG. 6 illustrates a pair of specifications for two illustrative constructors in the CPAMA class that create and initialize CPAMA objects in a desired format.

FIG. 6 illustrates a pair of specifications for two illustrative constructors that create and initialize CPAMA objects in a desired format. Generally, the constructors create the CPAMA object with an appropriate format. In the illustrative implementation, the CCC page/access system 235 supports the creation and initialization of CPAMA objects using a first constructor, set forth in section 610, when the ACA is to be stored as an access mobile address, or a second constructor, set forth in section 650, when the ACA is to be stored in an ANSI IMSI format. Thereafter, the CPAMA object will manage all access to the mobile information contained in the object.

Member Functions

As previously indicated, a CPAMA object is passed around within the software and the address information is extracted from the CPAMA object using the member functions of the class. Generally, the member retrieval functions read the CPAMA object in a certain way, and can provide the mobile address in the appropriate format for the recipient. Thus, the user of the class does not need to know a particular mobile address value, or how the mobile address is stored. In order to retrieve information pertaining to an address object, the user of the class can request the information from the CPAMA object using the class member functions. The CPAMA class also provides a member function ("==") to test equality of two CPAMA objects and a member function ("=") to assign one mobile address object to another without the user needing to now how it is done.

Figure 7A:
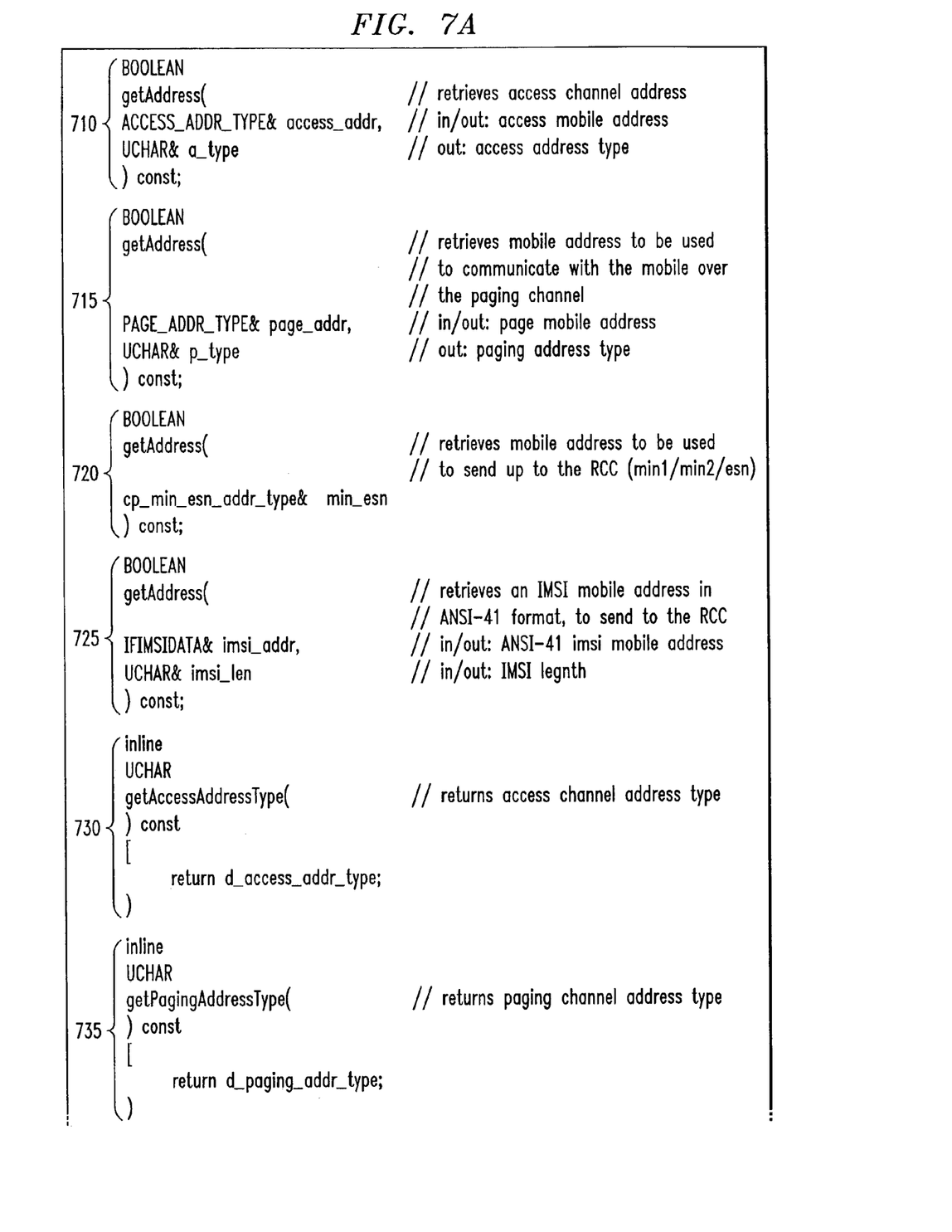
FIG. 7 illustrates a set of specifications for illustrative member functions in the CPAMA class that manipulate and extract the data contained in an CPAMA object.
Figure 7B:
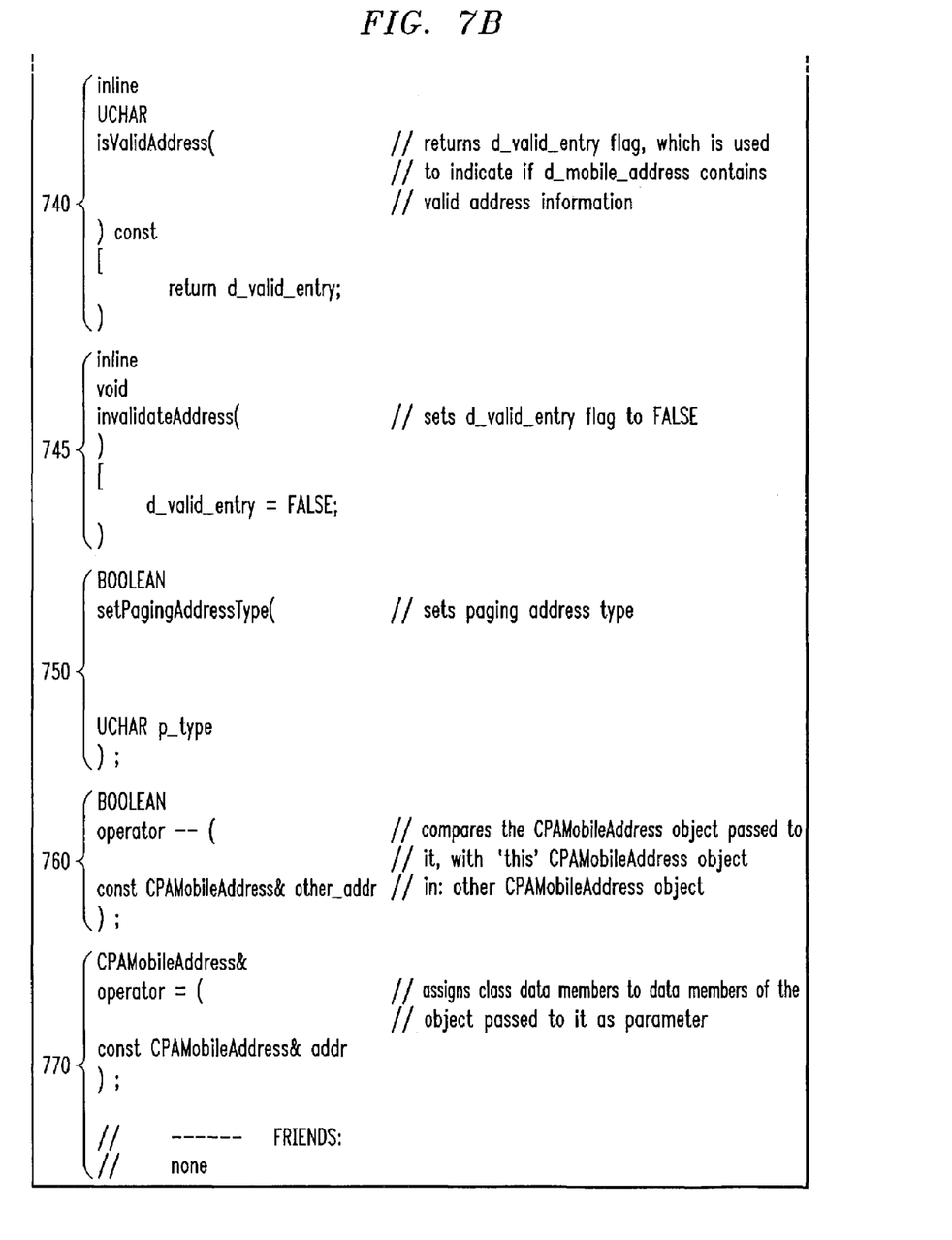

FIG. 7 illustrates a set of specifications for illustrative member functions that manipulate and extract the data contained in an CPAMA object. In the illustrative implementation, the CCC page/access system 235 supports four get Address functions. A first function, set forth in section 710, retrieves the mobile address information in the ACA format. A second get address function, in section 715, retrieves a mobile address to be used for communications to the mobile unit 160 on the paging channel. Additional get address functions retrieve an access address in an access channel format (min1/min2/esn) or ANSI IMSI format for call processing messages destined for the cell site controller 230, in sections 720 and 725, respectively. In addition, two functions are provided in sections 730 and 735, respectively, for returning the access channel address type or paging channel address type. Additional functions, set forth in records 740, 745 and 750, respectively, are provided to return the valid entry flag, set the valid entry flag and to set the paging address type. Finally, the member function ("=="), set forth in section 760, tests equality of two CPAMA objects and the member function ("="), set forth in section 770, assigns one mobile address object to another.

It is to be understood that the embodiments and variations shown and described herein are merely illustrative of the principles of this invention and that various modifications may be implemented by those skilled in the art without departing from the scope and spirit of the invention.

We claim:

1. A method for supporting a plurality of mobile address types for a given wireless device in a wireless communication network, comprising the steps of:
    defining a mobile address class that allows said plurality of mobile address types for said given wireless device to be processed in a uniform manner; and
    providing a set of constructors to create a new instances of a mobile address class that allow at least one of said plurality of mobile address types for said given wireless device to be mapped to a different mobile address type for said given wireless device in one of a plurality of formats.

2. The method of claim 1, wherein one of said constructors stores said mobile address information as an access mobile address.

3. The method of claim 1, wherein one of said constructors stores said mobile address information in an ANSI IMSI format.

4. A method for supporting a plurality of mobile address types for a given wireless device in a wireless communication network, comprising the steps of:
    defining a mobile address class that allows said plurality of mobile address types for said given wireless device to be processed in a uniform manner; and
    providing a set of member functions associated with said mobile address class that allow mobile address information to be retrieved from mobile address objects in said mobile address class in a desired format, wherein a first mobile address type for said given wireless device is mapped to a different mobile address type.

5. The method of claim 4, wherein one of said member functions retrieves mobile address information in an access channel mobile address format.

6. The method of claim 4, wherein one of said member functions retrieves mobile address information in a min1/min2/esn format.

7. The method of claim 4, wherein one of said member functions retrieves mobile address information as an ANSI-formatted IMSI address.

8. The method of claim 4, wherein one of said member functions retrieves mobile address information indicating an access channel address type.

9. The method of claim 4, wherein one of said member functions retrieves mobile address information in a paging channel address format.

10. A method for supporting a plurality of mobile address types for a given wireless device in a wireless communication network, comprising:
providing a mobile address class that allows said plurality of mobile address types for said given wireless device to be processed in a uniform manner, wherein said mobile address class provides a set of class constructors that allow said mobile address information to be stored in an instance of a mobile address object in one of a plurality of formats, wherein a first mobile address type for said given wireless device is mapped to a different mobile address type.

11. The method of claim 10, wherein one of said constructors stores said mobile address information as an access mobile address.

12. The method of claim 10, wherein one of said constructors stores said mobile address information in an ANSI IMSI format.

13. A method for supporting a plurality of mobile address types for a given wireless device in a wireless communication network, comprising:
providing a mobile address class that allows said plurality of mobile address types for said given wireless device to be processed in a uniform manner, wherein said mobile address class provides a set of member functions that allow mobile address information to be retrieved from mobile address objects in a desired format, wherein a first mobile address type for said given wireless device is mapped to a different mobile address type.

14. The method of claim 13, wherein one of said member functions retrieves mobile address information in an access channel mobile address format.

15. The method of claim 13, wherein one of said member functions retrieves mobile address information in a min1/min2/esn format.

16. The method of claim 13, wherein one of said member functions retrieves mobile address information as an ANSI-formatted IMSI address.

17. The method of claim 13, wherein one of said member functions retrieves mobile address information indicating an access channel address type.

18. The method of claim 13, wherein one of said member functions retrieves mobile address information in a paging channel address format.

19. A system for supporting a plurality of mobile address types for a given wireless device in a wireless communication network, comprising:
a memory for storing computer readable code; and
a processor operatively coupled to said memory, said processor configured to:
provide a mobile address class that allows said plurality of mobile address types for said given wireless device to be processed in a uniform manner, wherein said mobile address class provides a set of class constructors that allow said mobile address information to be stored in an instance of a mobile address object in one of a plurality of formats and wherein a first mobile address type for said given wireless device is mapped to a different mobile address type.

20. A system for supporting a plurality of mobile address types for a given wireless device in a wireless communication network, comprising:
a memory for storing computer readable code; and
a processor operatively coupled to said memory, said processor configured to:
provide a mobile address class that allows said plurality of mobile address types for said given wireless device to be processed in a uniform manner, wherein said mobile address class provides a set of member functions that allow mobile address information to be retrieved from mobile address objects in a desired format and wherein a first mobile address type for said given wireless device is mapped to a different mobile address type.

21. A method for supporting a plurality of mobile address types for a given wireless device in a wireless communication network, comprising the steps of:
defining a mobile address class that allows said plurality of mobile address types for said given wireless device to be processed in a uniform manner; and
storing said mobile address information in a mobile address object in one of a plurality of formats using an appropriate constructor to create a new instances of a mobile address class for said given wireless device, wherein a first mobile address type for said given wireless device is mapped to a different mobile address type.

22. A method for supporting a plurality of mobile address types for a given wireless device in a wireless communication network, comprising the steps of:
defining a mobile address class that allows said plurality of mobile address types for said given wireless device to be processed in a uniform manner; and
retrieving mobile address information in a desired format from a mobile address objects for said given wireless device in said mobile address class using a set of member functions associated with said mobile address class wherein a first mobile address type for said given wireless device is mapped to a different mobile address type.

* * * * *

UNITED STATES PATENT AND TRADEMARK OFFICE
CERTIFICATE OF CORRECTION

PATENT NO. : 7,103,355 B2　　　　　　　　　　　　　　　　　　　　　Page 1 of 1
APPLICATION NO. : 10/460534
DATED : September 5, 2006
INVENTOR(S) : Chandnani et al.

It is certified that error appears in the above-identified patent and that said Letters Patent is hereby corrected as shown below:

Column 8, line 47, before "for said" and after "mobile address" replace "objects" with -- object --.

Signed and Sealed this

Twenty-first Day of November, 2006

JON W. DUDAS
*Director of the United States Patent and Trademark Office*